United States Patent
Choi

(10) Patent No.: US 9,812,976 B2
(45) Date of Patent: Nov. 7, 2017

(54) CONTROL OF A STARTUP CIRCUIT USING A FEEDBACK PIN OF A PWM CONTROLLER INTEGRATED CIRCUIT CHIP

(71) Applicant: FAIRCHILD SEMICONDUCTOR CORPORATION, San Jose, CA (US)

(72) Inventor: Hangseok Choi, Bedford, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/144,316

(22) Filed: May 2, 2016

(65) Prior Publication Data

US 2017/0005583 A1 Jan. 5, 2017

Related U.S. Application Data

(60) Provisional application No. 62/186,681, filed on Jun. 30, 2015.

(51) Int. Cl.
*H02M 1/36* (2007.01)
*H02M 3/335* (2006.01)
*H02M 1/00* (2006.01)

(52) U.S. Cl.
CPC ......... *H02M 3/33553* (2013.01); *H02M 1/36* (2013.01); *H02M 2001/0006* (2013.01); *H02M 2001/0009* (2013.01)

(58) Field of Classification Search
CPC ...................................................... H02M 1/36
See application file for complete search history.

(56) References Cited

U.S. PATENT DOCUMENTS

| 6,044,428 | A | 3/2000 | Rayabhari |
| 6,150,805 | A | 11/2000 | Rapp |
| 6,194,861 | B1 | 2/2001 | Bang |
| 6,344,980 | B1 | 2/2002 | Hwang et al. |
| 6,385,060 | B1 * | 5/2002 | Basso ..................... H02M 1/32 363/21.07 |
| 6,469,914 | B1 | 10/2002 | Hwang et al. |
| 6,853,164 | B1 | 2/2005 | Prinz et al. |

(Continued)

OTHER PUBLICATIONS

W1707 Low-Power Off-Line Digital Green-Mode PWM Controller, Mar. 8, 2012, pp. 1-13, iWatt Power Management Simplified Digitally.

*Primary Examiner* — Harry Behm
(74) *Attorney, Agent, or Firm* — Okamoto & Benedicto LLP

(57) ABSTRACT

A power supply includes a control transistor that controls a primary winding of a transformer to induce current on a secondary winding of the transformer to generate an output voltage. A pulse width modulation (PWM) controller integrated circuit (IC) chip drives the control transistor through a gate pin. The PWM controller IC chip has a feedback pin that receives a feedback signal indicative of the output voltage. A high voltage (HV) startup transistor is controlled through the feedback pin. The HV startup transistor turns ON during startup to generate a supply voltage from current received from the input voltage of the power supply. The HV startup transistor turns OFF when the supply voltage reaches a startup voltage level that is sufficient to start the switching operation of the control transistor and thereby receive operating current from an auxiliary winding of the transformer.

20 Claims, 4 Drawing Sheets

(56) References Cited

U.S. PATENT DOCUMENTS

| | | |
|---|---|---|
| 6,933,710 B2 | 8/2005 | Shieh |
| 6,975,101 B1 | 12/2005 | Marin et al. |
| 7,391,629 B2 | 6/2008 | Ryu et al. |
| 7,525,819 B2 | 4/2009 | Choi |
| 7,782,038 B2 | 8/2010 | Klein |
| 8,129,959 B1 | 3/2012 | Balogh |
| 8,513,926 B2 | 8/2013 | Park et al. |
| 8,638,575 B2 | 1/2014 | Dunipace |
| 8,724,278 B2 | 5/2014 | Grulich |
| 8,957,657 B2 | 2/2015 | Zhao et al. |
| 9,069,364 B2 | 6/2015 | Kujala et al. |
| 9,081,398 B2 | 7/2015 | Kujala et al. |
| 9,106,149 B2 | 8/2015 | Dunipace |
| 9,184,653 B2 | 11/2015 | Eom et al. |
| 2003/0174528 A1* | 9/2003 | Wong .................... H02M 3/156 363/147 |
| 2004/0218410 A1* | 11/2004 | Yamada ................. H02M 1/36 363/125 |
| 2008/0266907 A1* | 10/2008 | Kim ....................... H02M 1/36 363/21.1 |
| 2010/0165685 A1* | 7/2010 | Huang ................... H02M 1/36 363/127 |
| 2013/0193940 A1* | 8/2013 | Louvel ................. H02M 3/156 323/282 |

\* cited by examiner

CONTROL OF A STARTUP CIRCUIT USING A FEEDBACK PIN OF A PWM CONTROLLER INTEGRATED CIRCUIT CHIP

CROSS-REFERENCE TO RELATED APPLICATION

This application claims the benefit of U.S. Provisional Application No. 62/186,681, filed Jun. 30, 2015, which is incorporated herein by reference in its entirety.

BACKGROUND OF THE INVENTION

1. Field of the Invention

The present invention relates generally to electrical circuits, and more particularly but not exclusively to pulse width modulation controller integrated circuit chips.

2. Description of the Background Art

A switching mode power supply (SMPS) with flyback topology typically includes a transformer with a primary winding that is controlled by a control transistor. The control transistor is driven by a pulse-width modulation (PMW) controller to induce current on a secondary winding of the transformer. Current induced on the secondary winding charges an output capacitor to generate an output voltage. A supply voltage of the PWM controller may be generated from operating current induced on an auxiliary winding of the transformer.

During startup, the PWM controller may not be fully operational to drive the control transistor to induce current on the auxiliary winding. The SMPS may thus include a high voltage (HV) startup circuit to allow the PWM controller to receive current from an input voltage of the power supply. In a typical implementation, an HV startup circuit includes an HV startup transistor that is turned ON to allow the PWM controller to receive current from the input voltage of the power supply to generate a supply voltage during startup. The HV startup transistor is turned OFF once the supply voltage increases to a level that is sufficient to switch the control transistor and allow operating current to be received from the auxiliary winding.

FIG. 1 shows an example PWM controller integrated circuit (IC) chip 101 with an internal HV startup circuit. Note that the PWM controller IC chip 101 has eight pins. FIG. 2 shows the PWM controller IC chip 101 as employed in an SMPS. As shown in FIG. 2, the PWM controller IC chip 101 includes an HV startup circuit comprising a junction field effect transistor (JFET) being employed as an HV startup transistor. An internal HV startup circuit simplifies usage of the PWM controller IC, but increases the pin count of the PWM controller IC chip by at least two pins: an HV pin for tapping to the primary winding and an NC (no connection) pin to provide high voltage spacing for safety reasons.

FIG. 3 shows an example PWM controller IC chip 151 with an external HV startup transistor 152. Note that the PWM controller IC chip 101 has six pins. FIG. 4 shows the PWM controller IC chip 151 as employed in an SMPS. The PWM controller IC chip 151 controls the HV startup transistor 152 from one pin (pin 3) and receives a feedback signal indicative of the output voltage on another pin (pin 2). Using an external HV startup transistor reduces the pin count of the PWM controller IC chip, but requires additional external circuitry.

SUMMARY

In one embodiment, a power supply includes a control transistor that controls a primary winding of a transformer to induce current on a secondary winding of the transformer to generate an output voltage. A pulse width modulation (PWM) controller integrated circuit (IC) chip drives the control transistor through a gate pin. The PWM controller IC chip has a feedback pin that receives a feedback signal indicative of the output voltage. A high voltage (HV) startup transistor is controlled through the feedback pin. The HV startup transistor turns ON during startup to generate a supply voltage from the input voltage of the power supply. The HV startup transistor turns OFF when the supply voltage reaches a startup voltage level that is sufficient to start the switching operation of the control transistor and thereby receive operating current from an auxiliary winding of the transformer.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 2:
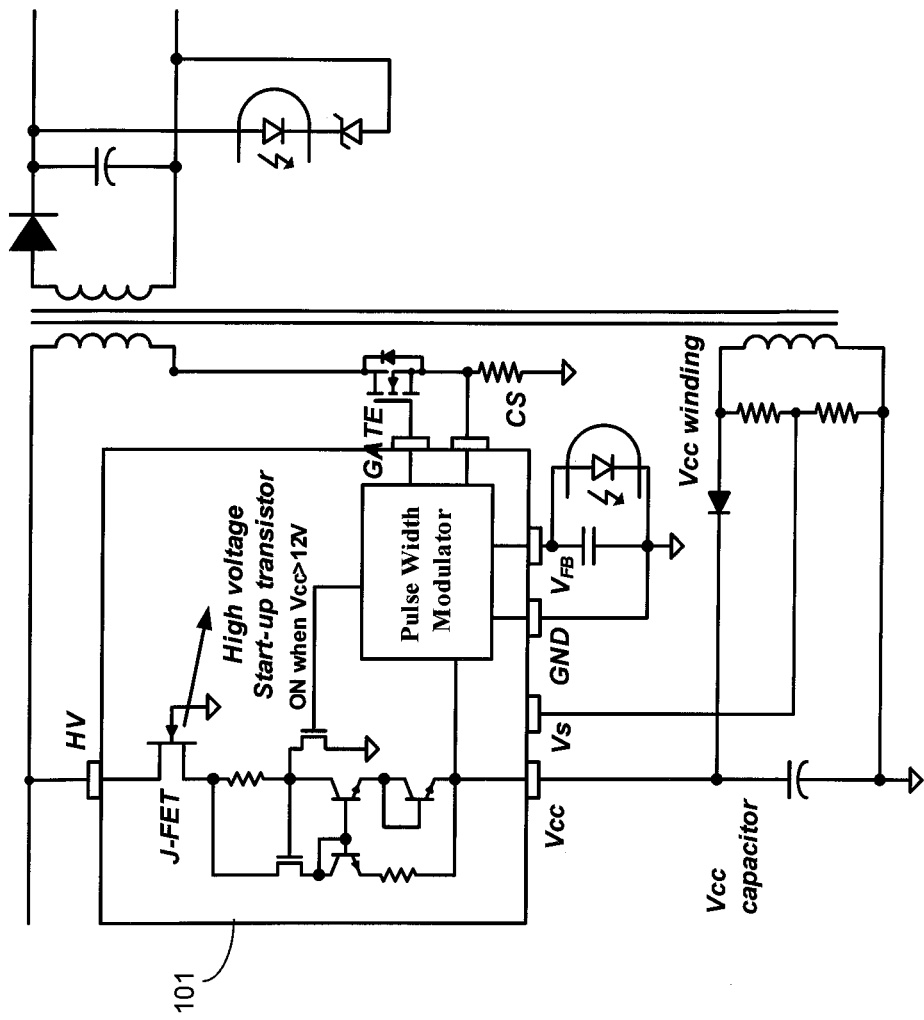
FIG. 2 shows the PWM controller IC chip of FIG. 1 as employed in an SMPS.
Figure 1:
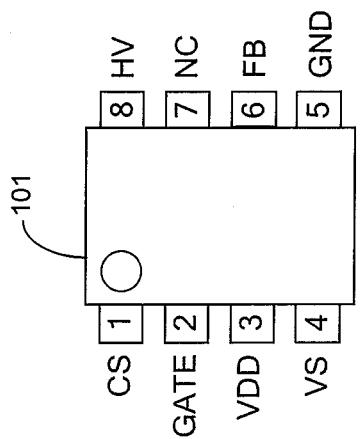
FIG. 1 shows an example PWM controller IC chip with an internal HV startup circuit.
Figures 3, 4:
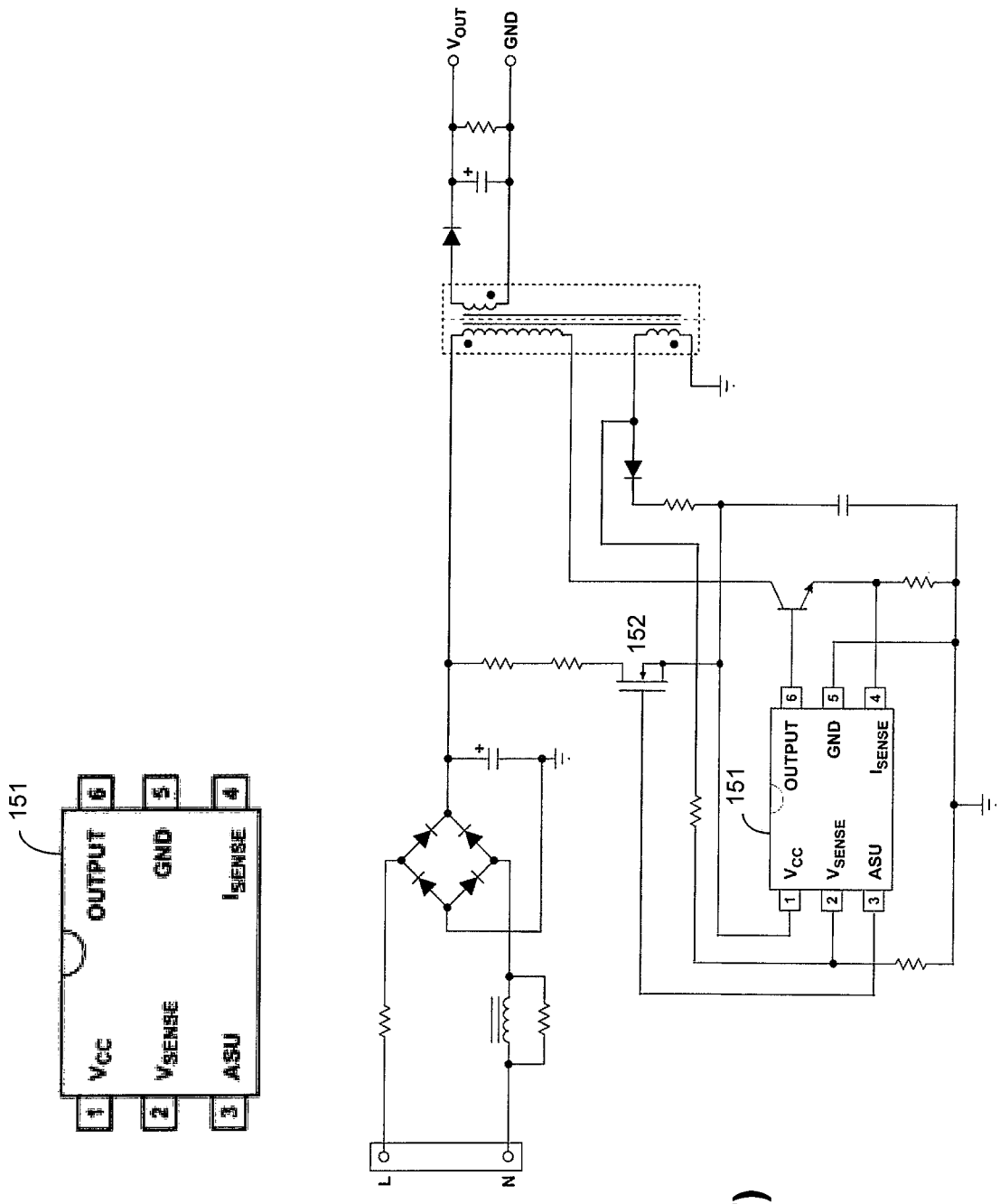
FIG. 3 shows an example PWM controller IC chip with an external HV startup transistor.
FIG. 4 shows the PWM controller IC chip of FIG. 3 as employed in an SMPS.
Figure 5:
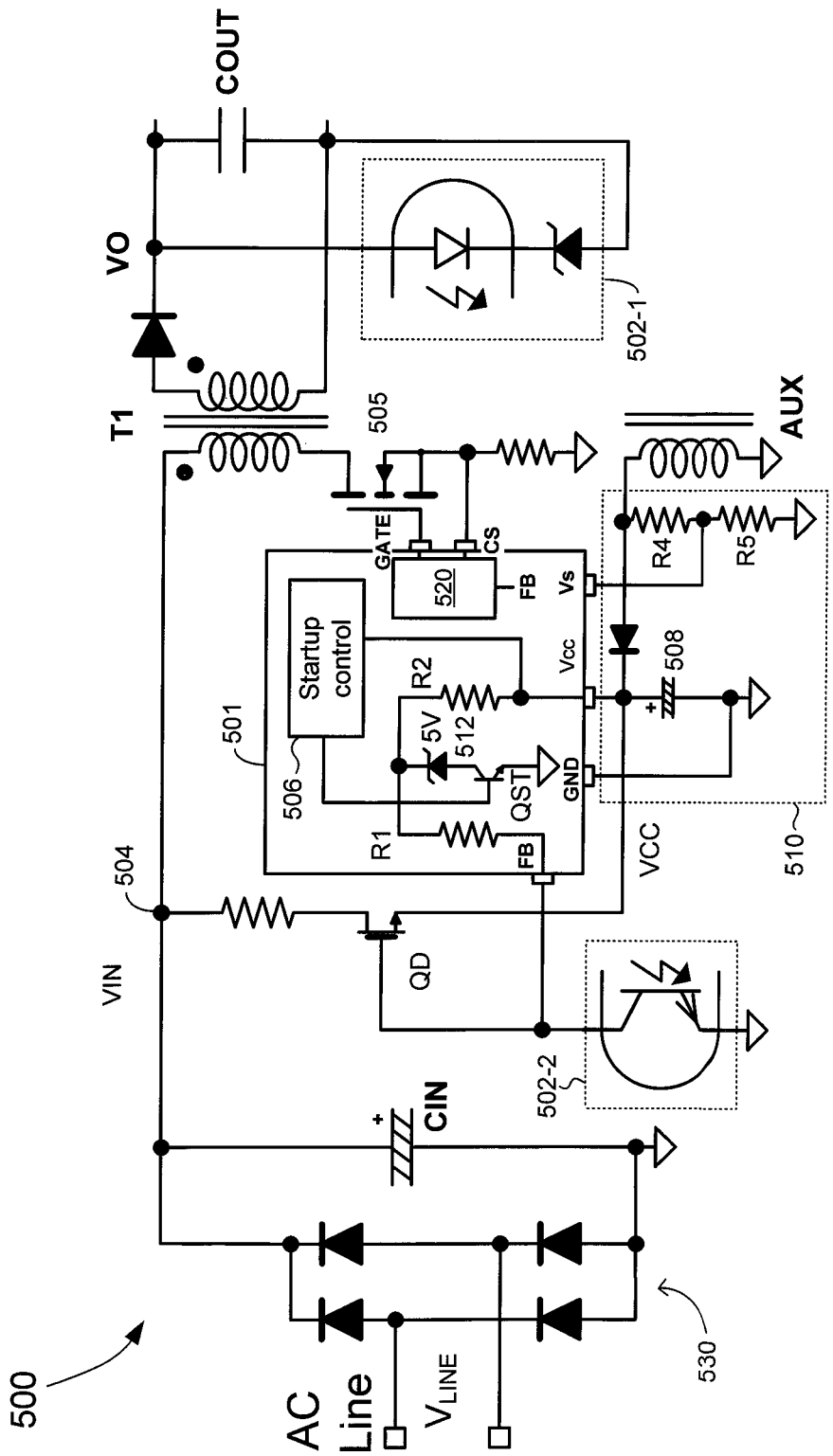
FIG. 5 shows a schematic diagram of an SMPS in accordance with an embodiment of the present invention.

FIG. 5 shows a schematic diagram of an SMPS 500 in accordance with an embodiment of the present invention. In the example of FIG. 5, the SMPS 500 includes a rectifier 530 that rectifies an AC line voltage. The capacitor CIN filters the rectified AC line voltage to generate an input voltage at the HV node 504.

In the example of FIG. 5, the SMPS 500 includes a control transistor 505 that couples and decouples a primary winding of a transformer T1 to ground to induce current on the secondary winding of the transformer T1. Current induced on the secondary winding charges an output capacitor COUT to generate an output voltage VO. In the example of FIG. 5, the SMPS 500 includes a PWM controller IC chip 501 for controlling switching operation of the control transistor 505.

In the example of FIG. 5, the PWM controller IC chip 501 has a packaging with a plurality of pins. In the example of FIG. 5, the PWM controller IC chip 501 has six pins, namely an FB (feedback) pin, a GND (ground) pin, a VS (voltage sense) pin, a VCC (supply voltage) pin, a CS (current sense) pin, and a GATE pin.

In the example of FIG. 5, the PWM controller IC chip 501 outputs a drive signal on the GATE pin for controlling the switching operation of the control transistor 505. The PWM controller IC chip 501 further includes the CS pin for receiving a current sense signal indicative of current through the primary winding of the transformer T1 and the GND pin for receiving a ground reference. In the example of FIG. 5, a feedback circuit 502 (502-1, 502-2) is represented by an optocoupler that senses the output voltage VO on the secondary side and that provides on the primary side a feedback signal indicative of the output voltage VO. That is, the feedback circuit 502 allows for sensing the output voltage VO on the secondary side for regulation purposes, and for providing the sensed output voltage to the PWM controller IC chip 501 on the primary side.

In the example of FIG. 5, the PWM controller IC chip 501 includes the FB pin for receiving the feedback signal indicative of the output voltage VO. To maintain a regulated output voltage VO, the PWM controller IC chip 501 includes a pulse width modulator 520 that outputs a control signal on the GATE pin to drive the gate of the control transistor 505 by PWM based on the feedback signal received on the FB pin and the current sense signal received on the CS pin.

In the example of FIG. 5, a bias circuit 510 generates a supply voltage for powering the PWM controller IC chip 501. During normal operation after startup, the bias circuit 510 generates the supply voltage from operating current induced on an auxiliary winding (AUX) of the transformer T1. The PWM controller IC chip 501 receives the supply voltage on the VCC pin. During startup, operating current cannot be received from the auxiliary winding because the PWM controller IC chip 501 is yet to drive the control transistor 505. Accordingly, the SMPS 500 includes a startup circuit comprising an HV startup transistor QD, a start transistor QST, and a startup control circuit 506. In the example of FIG. 5, the HV startup transistor QD is external to the PWM controller IC chip 501, and the start transistor QST and the startup control circuit 506 are internal to the PWM controller IC chip 501. During startup, the startup circuit is configured to generate the supply voltage of the PWM controller IC chip 501 from current received from the primary winding of the transistor T1.

In the example of FIG. 5, the PWM controller IC chip 501 includes the VS pin for sensing the output voltage VO from the auxiliary winding (AUX) of the transformer T1. The VS pin may be used by the PWM controller IC chip 501 for output voltage sensing (when there is no feedback circuit 502), drain voltage valley detection for quasi-resonant operation, output voltage over-voltage protection (OVP), etc. Because the feedback circuit 502 provides output voltage sensing for output voltage regulation, the VS pin is only used for valley detection and output voltage OVP in the example of FIG. 5. The bias circuit 510 may include a resistor divider formed by resistors R4 and R5 to generate a voltage drop that is indicative of the output voltage VO.

In the example of FIG. 5, the startup control circuit 506 is integrated in the PWM controller IC chip 501 and the HV startup transistor QD is external to the PWM controller IC chip 501. In one embodiment, the HV startup transistor QD is a depletion mode metal oxide semiconductor field effect transistor (MOSFET) that is coupled to the primary winding on the HV node 504. In one embodiment, the gate of the HV startup transistor QD and a collector of the phototransistor (see 502-2) of the feedback circuit 502 are both connected to the FB pin. The emitter of the phototransistor of the feedback circuit 502 is connected to ground.

The startup control circuit 506 may comprise an electrical circuit that turns ON the startup HV startup transistor QD during startup to couple the bias circuit 510 to the input voltage of the power supply to generate the supply voltage. The startup control circuit 506 may turn OFF the HV startup transistor QD after startup, i.e., once the supply voltage reaches a level sufficient to initiate switching of the control transistor 505 and receive operating current from the auxiliary winding. The startup control circuit 506 may monitor the supply voltage on the VCC pin.

The HV startup transistor QD advantageously does not require a dedicated pin on the PWM controller IC chip 501. In the example of FIG. 5, the HV startup transistor QD is controlled from the FB pin of the PWM controller IC chip 501, which is also employed to receive the feedback signal indicative of the output voltage VO. That is, the same pin of the PWM controller IC chip 501 (FB pin) may be employed both for secondary-side output voltage sensing and for controlling the HV startup transistor QD. This reduces pin count, allowing for an extra pin that may be used for other functions.

During startup of the SMPS 500, the PWM controller IC chip 501 connects the FB pin to the VCC pin. More particularly, during startup, the start transistor is OFF, thereby connecting the source and the gate of the HV startup transistor QD together, which results in the gate-to-source voltage VGS of the HV startup transistor QD to be zero (VGS=0). Because its voltage VGS is zero and the HV startup transistor QD is a depletion mode MOSFET, the HV startup transistor QD is turned ON, thereby allowing current from the input voltage of the power supply to charge the capacitor 508 through the HV startup transistor QD, thus increasing the charge on the capacitor 508, which is indicative of the supply voltage.

In one embodiment, the start transistor QST is a bipolar junction transistor. In the example of FIG. 5, the collector of the start transistor QST is connected to an anode of a Zener diode 512. The cathode of the Zener diode 512 is connected to the FB pin by way of a resistor R1 and to the VCC pin by way of a resistor R2. The base of the start transistor QST is controlled by the startup control circuit 506, and the emitter of the start transistor QST is connected to ground. When the start transistor QST is OFF, the FB pin is connected to the VCC pin through the resistors R1 and R2. When the start transistor QST is ON, the Zener diode 512 provides biasing voltage to the FB pin.

The startup control circuit 506 monitors the supply voltage on the VCC pin and turns ON the start transistor QST when the supply voltage reaches a start voltage level (e.g., 12V) sufficient to start switching of the control transistor 505. In other words, the startup of the SMPS 500 may be deemed to end when the supply voltage reaches the start voltage level. When the start transistor QST turns ON, the Zener diode 512 is reversed biased and starts biasing the feedback circuit 502 through the FB pin, thereby turning OFF the HV startup transistor QD and starting the normal switching operation of the control transistor 505. Switching the control transistor 505 allows operating current to be received from the auxiliary winding AUX to generate the supply voltage.

Figure 6:
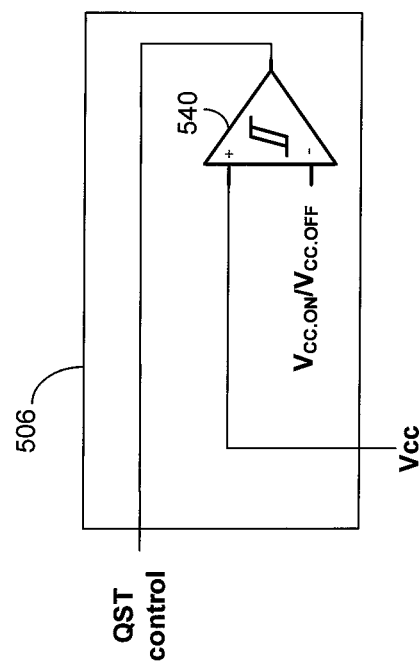
FIG. 6 shows a schematic diagram of a startup control circuit in accordance with an embodiment of the present invention.

FIG. 6 shows a schematic diagram of the startup control circuit 506 in accordance with an embodiment of the present invention. In the example of FIG. 6, the startup control circuit 506 comprises a hysteretic comparator 540 that compares the supply voltage VCC to a reference voltage(s).

In one embodiment, a reference voltage VCC.ON is a start voltage that indicates the supply voltage is ready for normal operation (e.g., 12V), and a reference voltage VCC.OFF is a not-ready voltage that indicates the supply voltage is not ready for normal operation (e.g., 8V). The hysteretic comparator 540 may be configured to output a QST control signal that turns ON the start transistor QST when the supply voltage is greater than the start voltage (VCC.ON) and that turns OFF the start transistor QST when the supply voltage is lower than the not-ready voltage (VCC.OFF). As can be appreciated, the reference voltages VCC.ON/VCC.OFF may be represented by a single reference voltage, with the difference between the reference voltages VCC.ON and VCC.OFF being the hysteresis of the hysteretic comparator 540. The hysteretic comparator 540 may sense the supply voltage from the VCC pin of the PWM controller IC chip 501 and may output the QST control signal to the control node (e.g., base) of the start transistor QST. The startup control circuit 506 may also be implemented using other circuit topologies without detracting from the merits of the present invention.

Figure 7:
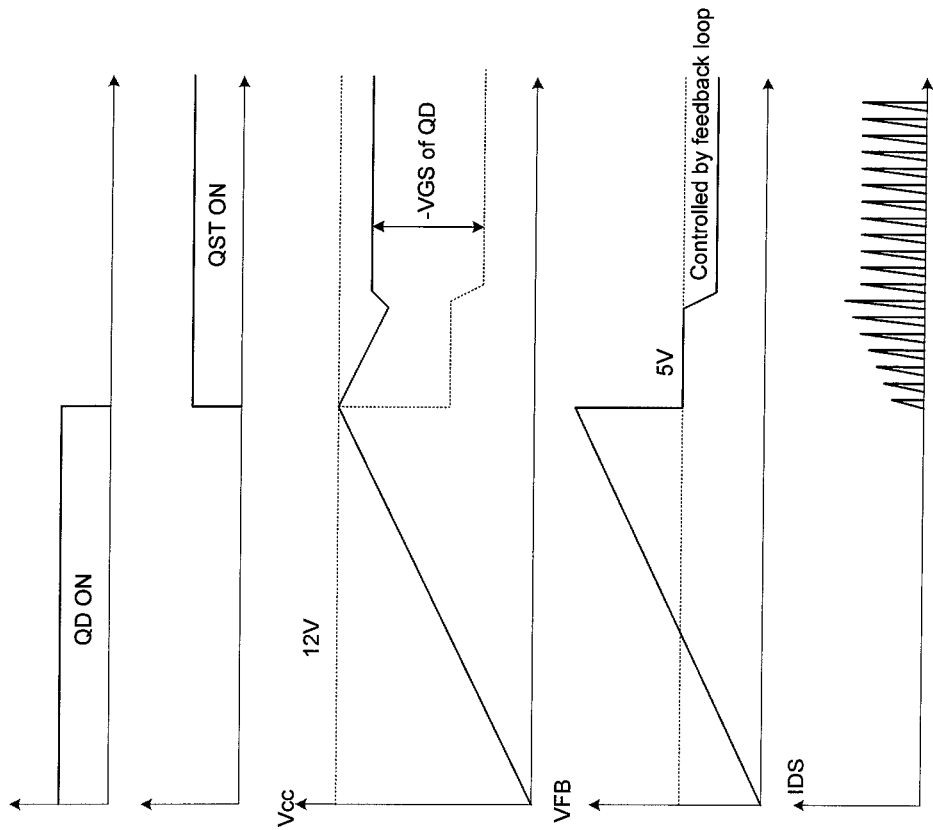
FIG. 7 shows example waveforms of the SMPS of FIG. 5 in accordance with an embodiment of the present invention.

FIG. 7 shows example waveforms of the SMPS 500 of FIG. 5 in accordance with an embodiment of the present invention. FIG. 7 shows, from top to bottom, the state of the HV startup transistor QD, the state of the start transistor QST, the supply voltage VCC on the capacitor 508, the feedback voltage on the FB pin (VFB), and the current through the control transistor 505 (IDS).

As shown in FIG. 7, when the SMPS 500 is first powered up from an OFF state, the HV startup transistor QD is ON, allowing the capacitor 508 to be to be charged from the input voltage of the power supply. The FB pin is connected to the capacitor 508 through the VCC pin of the PWM controller IC chip 501; the voltage on the FB pin (VFB) thus increases with the supply voltage (VCC). There is no current through the drain and source (IDS) of the control transistor 505 during this time because the control transistor 505 is not switching.

When the supply voltage increases to the start voltage, which is 12V in the example of FIG. 7, the startup control circuit 506 turns ON the start transistor QST, thereby turning OFF the HV startup transistor QD. At this time, switching of the control transistor 505 is initiated (see current IDS), the supply voltage is sustained by operating current received from the auxiliary winding AUX of the transformer T1, and the voltage on the FB pin is controlled by the feedback loop.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. An integrated circuit (IC) chip comprising:
   a gate pin that is configured to output a control signal for driving a control transistor of a switching mode power supply;
   a current sense pin that is configured to receive a current sense signal indicative of a current through the control transistor;
   a feedback pin that is configured to receive a feedback signal that is indicative of an output voltage of the switching mode power supply and is configured to be connected to a control terminal of a high voltage (HV) startup transistor that is external to the IC chip;
   a startup control circuit that is configured to drive the control terminal of the HV startup transistor from the feedback pin; and
   a pulse width modulator that is configured to generate the control signal that is output at the gate pin to regulate the output voltage by pulse width modulation (PWM) based on the feedback signal received on the feedback pin and the current sense signal received on the current sense pin.

2. The IC chip of claim 1, further comprising:
   a supply voltage pin that is configured to receive a supply voltage.

3. The IC chip of claim 2, wherein the IC chip is configured to connect the feedback pin to the supply voltage pin during startup of the switching mode power supply.

4. The IC chip of claim 1, further comprising a start transistor that is configured to turn ON to generate a bias voltage on the feedback pin when a supply voltage reaches an operational level.

5. The IC chip of claim 4, further comprising a Zener diode that is connected to a terminal of the start transistor and that provides the bias voltage when the start transistor is turned ON.

6. The IC chip of claim 4, wherein the startup control circuit is configured to turn ON the start transistor when the supply voltage reaches the operational level as indicated by a voltage on the supply voltage pin.

7. The IC chip of claim 1, wherein the HV startup transistor is a depletion mode MOSFET.

8. The IC chip of claim 7, wherein the IC chip is configured to connect a gate of the depletion mode MOSFET to a source of the depletion mode MOSFET during startup of the switching mode power supply.

9. A power supply comprising:
   a transformer comprising a first winding and a second winding;
   a control transistor that controls the first winding to induce current on the second winding to generate an output voltage of the power supply;
   a pulse width modulation (PWM) controller integrated circuit (IC) chip, the PWM controller IC chip having a first pin that outputs a drive signal that controls a switching operation of the control transistor, the PWM controller IC chip having a second pin that receives a feedback signal indicative of the output voltage of the power supply; and
   a high voltage (HV) startup transistor that is connected to the second pin, the HV startup transistor being configured to turn ON during startup of the power supply to generate a supply voltage from an input voltage, the startup transistor being configured to turn OFF after the startup of the power supply.

10. The power supply of claim 9, wherein the startup transistor is configured to turn OFF when the supply voltage reaches a start voltage level.

11. The power supply of claim 9, wherein the control transistor comprises a depletion mode MOSFET.

12. The power supply of claim 9, wherein the PWM controller IC further comprises a third pin that receives a supply voltage.

13. The power supply of claim 12, wherein the PWM controller IC connects the second pin to the third pin during the startup of the power supply.

14. The power supply of claim 13, wherein the PWM controller IC further comprises a fourth pin that is configured to receive a current sense signal that is indicative of current through the control transistor.

15. The power supply of claim 9, wherein the PWM controller IC further comprises a start transistor that is configured to turn ON to generate a bias voltage on the second pin when the supply voltage reaches an operational level.

16. The power supply of claim 9, wherein the second pin is connected to a gate of the HV startup transistor.

17. A method of operating a controller integrated circuit (IC) chip, the method comprising:
   receiving, on a feedback pin of the controller IC chip, a feedback signal indicative of an output voltage of a switching mode power supply;
   receiving, on a current sense pin of the controller IC chip, a current sense signal indicative of current through a control transistor that is switched to maintain the output voltage in regulation; and
   during startup of the switching mode power supply, controlling switching of a high voltage (HV) startup transistor that is connected to the feedback pin.

18. The method of claim 17, wherein the HV startup transistor is turned ON during the startup of the switching mode power supply and the HV startup transistor is turned OFF after the startup of the switching mode power supply.

19. The method of claim 17, further comprising:
   connecting the feedback pin to another pin of the controller IC chip during the startup of the switching mode power supply.

20. The method of claim 19, further comprising:
   providing a biasing voltage on the feedback pin after the startup of the switching mode power supply.

* * * * *